United States Patent [19]
Dilip et al.

[11] Patent Number: 6,094,673
[45] Date of Patent: Jul. 25, 2000

[54] METHOD AND APPARATUS FOR GENERATING AGENT SCRIPTS

[75] Inventors: Venkatachari Dilip, Cupertino; Janardhanan Jawahar, San Jose, both of Calif.

[73] Assignee: Aspect Communications, San Jose, Calif.

[21] Appl. No.: 09/008,025

[22] Filed: Jan. 16, 1998

[51] Int. Cl.[7] .................................................. G06F 13/00
[52] U.S. Cl. ............................................................. 709/202
[58] Field of Search ........................ 364/DIG. 1, DIG. 2; 709/200, 201, 202, 203

[56] References Cited

U.S. PATENT DOCUMENTS 5,950,173   9/1999   Perkowski .................................. 705/26

*Primary Examiner*—Robert B Harrell
*Attorney, Agent, or Firm*—Blakely, Sokoloff, Taylor & Zafman

[57] ABSTRACT

A system is described for generating an agent script. The system determines a web page being viewed by an information requester when a request for information was initiated. An agent script is generated on the web page being viewed by the information requester when the request for information was initiated. Additionally, the agent script may be generated based on an identity associated with the information requester, a history of web pages viewed by the information requester, or the identity of an agent handling the request for information. The system is also capable of displaying multiple information identifiers, based on various factors, such as the identity of the information requester, the web page viewed by the information requester, or the history of web pages viewed by the information requester.

30 Claims, 10 Drawing Sheets

AGENT SCRIPT

198

HELLO MR. JONES, MY NAME IS TOM, HOW CAN I HELP YOU WITH YOUR ACME COMPUTER SYSTEM?

202 — DON'T FORGET TO MENTION THE CURRENT SALE ITEMS!!

LINKS

200

FAQ - ACME COMPUTER SYSTEM SPECIFICATIONS
FAQ - CONFIGURING ACME COMPUTER SYSTEMS
FAQ - UPDRADING ACME COMPUTER SYSTEMS
FAQ - DISK DRIVE UPGRADES
FAQ - MEMORY UPGRADES
FAQ - INSTALLING NEW SOFTWARE
LIST OF CURRENT SALE ITEMS

204 — HTTP://

FIG. 7

METHOD AND APPARATUS FOR GENERATING AGENT SCRIPTS

FIELD OF THE INVENTION

The present invention relates to communication systems. More specifically, the invention provides a system that generates agent scripts and displays various information identifiers to an agent of a transaction processing system.

BACKGROUND

Various systems are available that allow two individuals or systems to communicate across a communication link. Particular systems, such as transaction processing systems, are adapted to allow a representative of a company or organization (such as a telephone agent) to communicate with customers or other individuals seeking information from the organization. A representative often reads a script to the customers or individuals with which the representative is communicating. This script may describe the organization generally or may discuss various products or promotions offered by the organization. Often, a representative reads the same script to all individuals, regardless of the type of information they desire. Although some systems allow an agent's script to include the name of the individual seeking information, these systems do not typically know the reason the individual is seeking assistance or the information the individual desires.

Certain existing systems limit representatives to verbally describing product features or verbally providing other information to the individuals with which they are communicating. In these systems, a representative may answer the same question several times in a single day for several different individuals. Additionally, a representative may spend a significant amount of time verbally describing visual features of a product without the use of a picture or other visual reference that would simplify and shorten the verbal description.

It is therefore desirable to provide a system that provides a mechanism that generates agent scripts directed toward the interests of the individual with which the agent is communicating. Additionally, it is desirable to provide a system that allows a representative of an organization to communicate various information to the individual, such as visual images or other visual information.

SUMMARY OF THE INVENTION

The present invention provides a system that generates agent scripts and displays various information identifiers to an agent using a transaction processing system. A particular embodiment of the invention generates an agent script by determining a web page being viewed by an information requester when a request for information was initiated. The system then generates an agent script based on the web page being viewed by the information requester when the request for information was initiated.

Other embodiments of the invention determine an identity associated with the information requester and generate the agent script based on both the web page being viewed by the information requester and the identity associated with the information requester.

Additional embodiments of the invention generate the agent script based on a history of web pages viewed by the information requester.

Other embodiments of the invention display multiple information identifiers based on various factors.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 7 illustrates another embodiment of various frames that may be displayed to an agent using the agent's computer.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present the invention is related to a system capable of generating and displaying agent scripts and displaying various information identifiers to an agent of a transaction processing system. Each information identifier is associated with a particular set of information that can be communicated to another individual or system. Embodiments of the invention provide a system that generates agent scripts based on a web page being viewed by an individual requesting information about a product, service, or organization. Additionally, generation of the agent script may be based on the identity of the agent and the identity of the individual requesting information. Similarly, the information identifiers are displayed based on the web page viewed by the individual, the individual's identity, and the agent's identity. The teachings of the present invention can be used with any type of system in which an agent or other representative communicates with a customer or other individual or system.

Particular embodiments of the invention are described below as used in a transaction processing environment.

However, the teachings of the present invention may be used in any data communication environment and with any type of data communication system. Embodiments of the invention described below communicate information (such as web page information) across a network. In alternate embodiments, the teachings of the present invention are applied to the communication of any type of information across any type of communication link.

Exemplary transactions in a transaction processing environment include telephone calls, facsimile transmissions, electronic mail (e-mail), video sessions, or network sessions (such as an Internet session). A particular transaction can be either inbound (e.g., received by a transaction processing system) or outbound (e.g., transmitted from a transaction processing system).

A transaction processing system is any device capable of receiving, transmitting, queuing, routing, or otherwise processing a transaction. A transaction processing system may also handle mixed transactions (e.g., receive a telephone call and respond to the telephone call using e-mail). Example transaction processing systems include automatic call distributors (ACDs), call centers, and other telephone call processing devices. The teachings of the present invention may be used with any type of transaction processing system.

Figure 1:
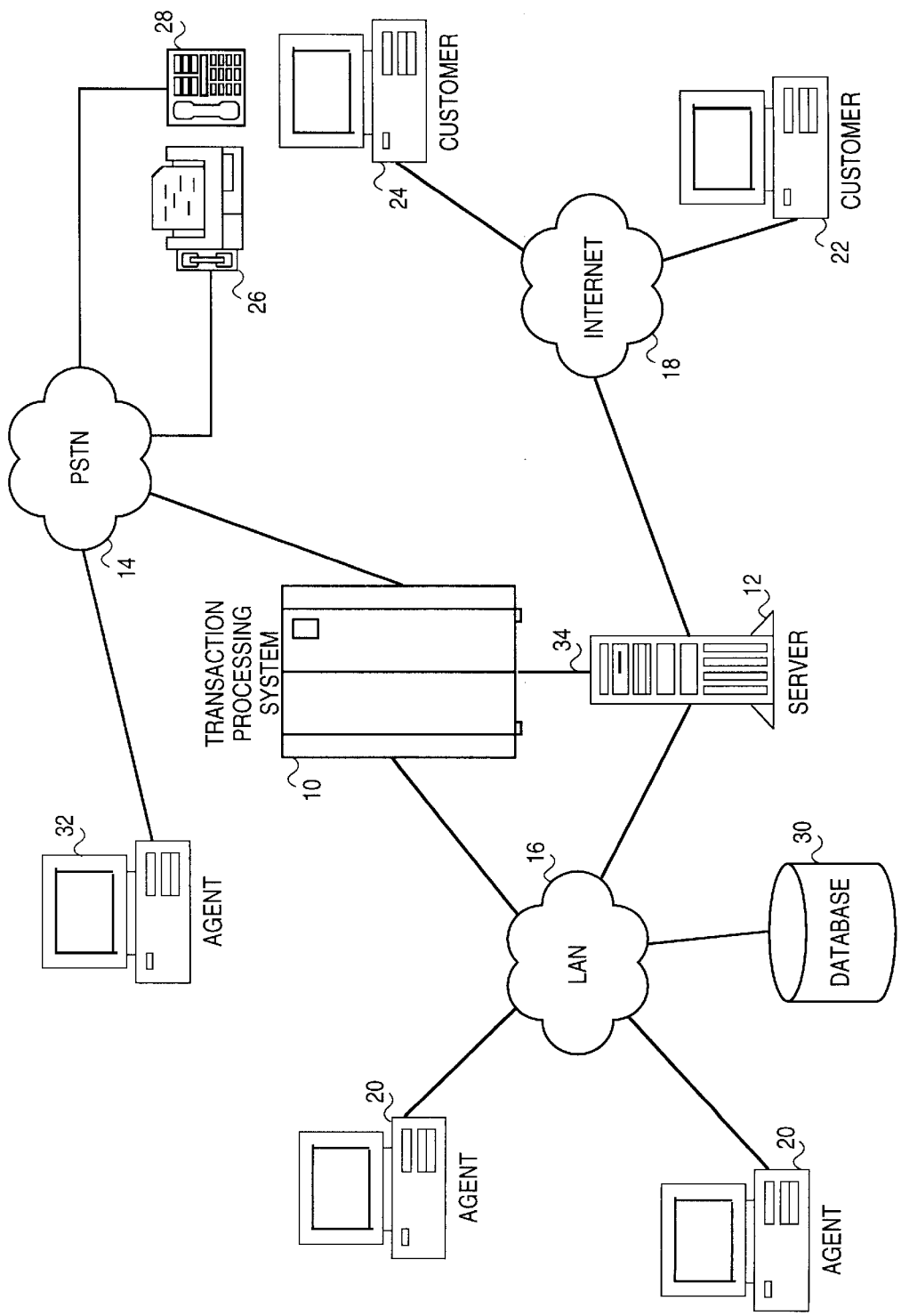
FIG. 1 illustrates an embodiment of a transaction processing environment in which the present invention may be used.

FIG. 1 illustrates an embodiment of a transaction processing environment in which the present invention may be used. The transaction processing environment of FIG. 1 allows transaction initiators (e.g., customers) to contact an agent (e.g., a customer service agent) using various types of transactions. Similarly, the transaction processing environment allows an agent to respond to a received transaction (e.g., received from a customer) or initiate a new transaction.

A transaction processing system 10 is coupled to a server 12, a public switched telephone network (PSTN) 14 and a local area network (LAN) 16. Transaction processing system 10 is capable of processing various types of transactions, such as telephone calls, electronic mail (e-mail), voice mail, and facsimiles. Transaction processing system 10 is capable of receiving transactions from PSTN 14, LAN 16, and server 12. Similarly, transaction processing system 10 is capable of transmitting transactions to PSTN 14, LAN16, and server 12. For example, transaction processing system 10 can receive an incoming telephone call directly via PSTN 14. Another incoming telephone call may be received by server 12 (e.g., an Internet telephone call received across Internet 18) and provided to transaction processing system 10 across a communication link 34 or across LAN 16. In other situations, transaction processing system 10 may receive an incoming e-mail from server 12 or LAN 16

FIG. 1 illustrates a single server 12 capable of interacting with various components in the transaction processing environment. For example, server 12 may operate as a web server, an e-mail server, a fax server, and a video server. Additionally, server 12 can perform the functions of a control server, as discussed below. In alternate embodiments of the invention, the transaction processing environment may include multiple servers, in which each server is responsible for one or more types of transactions. For example, a web server processes all web-based transactions, an e-mail/fax server processes all e-mail and facsimile transactions, and a control server controls and manages various transactions and communication sessions in the transaction processing environment.

LAN 16 can be any type of network, including an intranet network, capable of communicating information between various nodes in the network. Further, LAN 16 may use any network topology and communicate data using any communication protocol. As shown in FIG. 1, multiple agents 20 are coupled to LAN 16. In a typical transaction processing environment, hundreds or thousands of agents may be coupled to one or more LANs 16, which are coupled to transaction processing system 10. Alternatively, some or all of the agents 20 may be coupled directly to transaction processing system 10, rather than coupled through LAN 16. Although agents 20 are represented in FIG. 1 by a computer, a particular agent 20 may utilize any type of device or system that allows interaction between the agent and another person or device (such as a customer or a customer's computer). For example, an agent handling only telephone call transactions may only use a telephone system, without requiring a computer. Similarly, an agent handling only e-mail messages may require a computer system, but not a telephone. In a particular embodiment of the invention, each agent has a computer system and a telephone (which may be integrated into the computer system), such that the agent is capable of handling and responding to multiple types of transactions (e.g., telephone calls, e-mail, voice mail, and facsimiles).

An agent 32 is not coupled to LAN 16, but instead is coupled to PSTN 14. Agents 20, discussed above, are located locally to transaction processing system 10 or include an access mechanism allowing agents 20 to establish a connection to LAN 16. Agent 32 is a remote agent or otherwise unable to directly connect to LAN 16. For example, agent 32 may be working at a location geographically distant from transaction processing system 10, such as working at home or traveling. Agent 32 establishes a connection with transaction processing system 10 across PSTN 14. Alternatively, agent 32 may connect with LAN 16 or transaction processing system 10 through Internet 18 or any other network or communication system.

A database 30 is coupled to LAN 16 and is used by transaction processing system 10, agents 20 and 32, and server 12 to store and retrieve various types of information. For example, database 30 may contain information about the transaction processing system, the performance of the system, and the agents and customers that use transaction processing system 10. Since database 30 is coupled to LAN 16, all agent computers, servers, and other devices coupled to LAN 16 are capable of storing and retrieving information from the database.

As shown in FIG. 1, Internet 18 is coupled to server 12 and customer computers 22 and 24. Customer computer 22 may include an Internet phone for establishing verbal communications between the customer and an agent across Internet 18. The customer using computer 24 has a telephone 28 and a fax machine 26 coupled to PSTN 14 and located near computer 24. Thus, the user of computer 24 may communicate with an agent of the transaction processing system using Internet 18 (e.g., using an Internet phone or e-mail application), fax machine 26, telephone 28, or any combination thereof. For example, customer 24 may generate and transmit an e-mail message across Internet 18 to server 12. Server 12 then communicates the e-mail to transaction processing system 10, which provides the e-mail to a particular agent or group of agents for response. Agents may be grouped together based on area of expertise, company department, or type of support provided (e.g., sales or technical support). The agent responding to the e-mail can respond with another e-mail message or may respond by telephone, facsimile, or any other type of transaction supported by the transaction processing system and the transaction initiator. In particular embodiments of the invention, the transaction initiator may specify the type of transaction used by the responding agent. For example, a transaction initiator may generate an e-mail transaction, but request that an agent respond with a telephone call. Although customer computers 22 and 24 are shown coupled directly to Internet 18, it will be appreciated that any communication mechanism can be used to couple computers 22 and 24 to Internet 18, such as PSTN 14 and an Internet Service Provider (ISP). In alternate embodiments, Internet 18 may be replaced with any communication network using any communication protocol.

The environment illustrated in FIG. 1 includes a separate LAN 16 and Internet 18. In alternate environments, LAN 16 and Internet 18 are merged into a single communication network capable of communicating information between any two or more devices coupled to the communication network.

Figure 2:
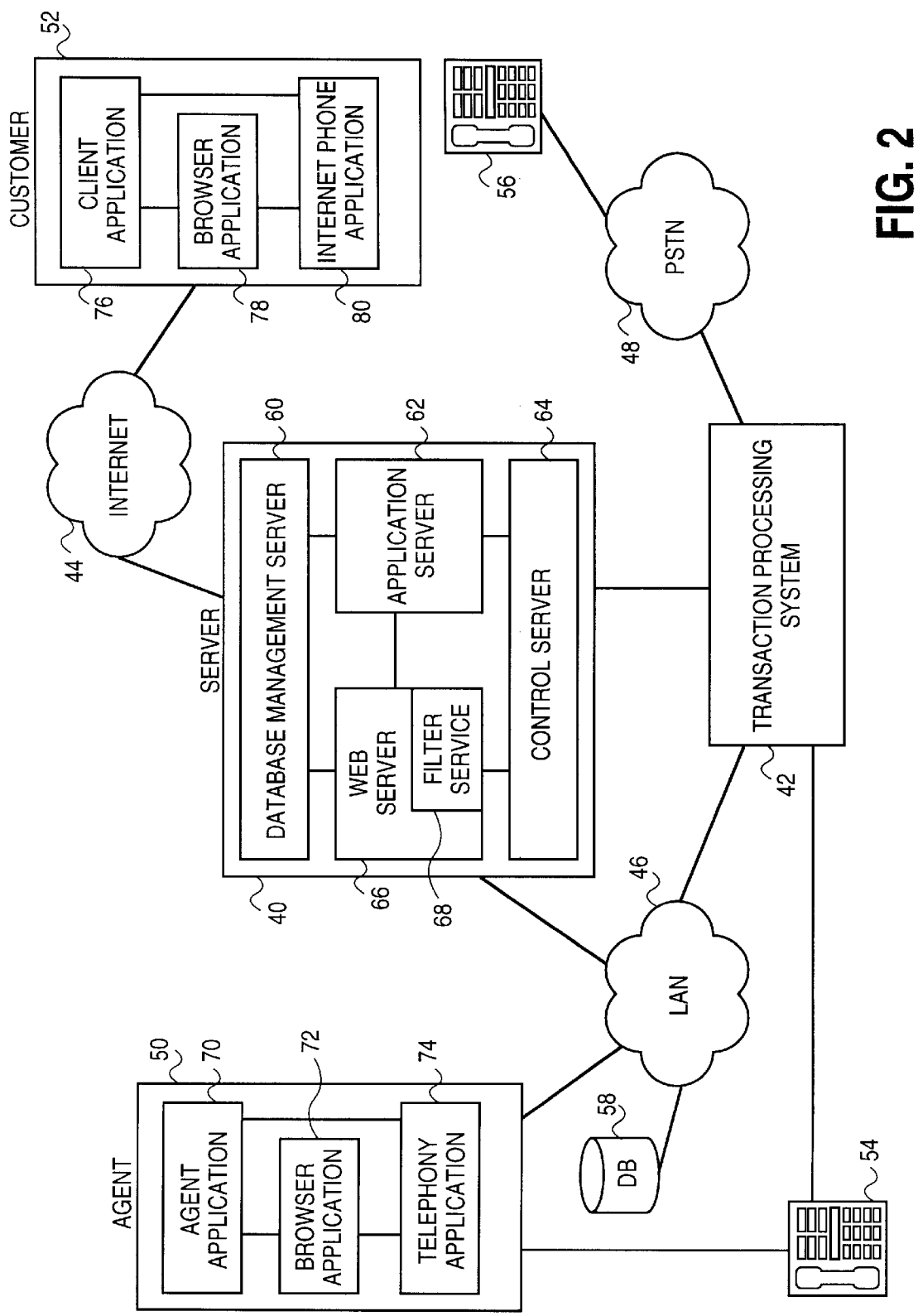
FIG. 2 illustrates an embodiment of a transaction processing environment including a server, an agent computer system, a customer computer system, and a transaction processing system coupled together using various networks.

FIG. 2 illustrates an embodiment of a transaction processing environment including a server 40, an agent computer system 50, a customer computer system 52, and a transaction processing system 42 coupled together using various networks. FIG. 2 illustrates a single agent computer system 50 and a single customer computer system 52. However, a typical transaction processing environment includes multiple agent computer systems and multiple customer computer systems. Server 40 is coupled to Internet 44, a LAN 46, and transaction processing system 42. Server 40 includes a database management server 60, an application server 62, a control server 64, and a web server 66. Additional details regarding server 40 are discussed below. In alternate embodiments, server 40, computer systems 50 and 52, and transaction processing system 42 are coupled together using different network configurations and network connections. Transaction processing system 42 is capable of processing various types of transactions, such as telephone calls, e-mail, voice mail, and facsimiles. In a particular embodiment of the invention, transaction processing system 42 is an automatic call distributor (ACD).

Agent computer system 50 includes an agent application 70, a browser application 72, and a telephony application 74. Agent application 70 interacts with other devices shown in FIG. 2 (e.g., server 40 and transaction processing system 42). For example, agent application 70 may retrieve information about a transaction initiator (such as account information and the types of products or services purchased) and display that information to the agent. In this example, agent application 70 is a client of database management server 60, which retrieves the appropriate information about the transaction initiator from a database 58. If the agent is a technical support agent, the information about the transaction initiator may include the types of products owned by the transaction initiator, previous problems encountered by the transaction initiator, and known problems with the products. Additionally, agent application 70 can display information regarding agent performance, the overall performance of the transaction processing system, and the current status of the agent (e.g., active or inactive).

Browser application 72 is any browser capable of communicating information across a communication link and displaying received information to the agent. In a particular embodiment, browser application 72 is capable of retrieving information from Internet 44 (e.g., in the form of Hypertext Markup Language (HTML) pages). Exemplary browser applications include Netscape Communicator™ sold by Netscape Communications Corporation of Mountain View, Calif., and Internet Explorer™ sold by Microsoft Corporation of Redmond, Wash. Embodiments of the invention exchange information between agent application 70 and browser application 72. In other embodiments of the invention, agent application 70 and browser application 72 are integrated into a single application.

Telephony application 74 controls a telephone 54 coupled to agent computer system 50 and transaction processing system 42. In other embodiments of the invention, a telephone adapter replaces telephone 54 and permits agent computer system 50 to perform the functions of a conventional telephone. For example, a WinSet™ adapter sold by Aspect Telecommunications of San Jose, Calif., may be used instead of telephone 54. Another embodiment of the invention uses a software-based telephone in place of telephone 54. In this embodiment, the software-based telephone is integrated into telephony application 74 and communicates with transaction processing system 42 through server 40 or LAN 46.

Customer computer system 52 includes a client application 76, a browser application 78, and an Internet phone application 80. Client application 76 may be any type of application capable of being executed by customer computer system 52. For example, client application 76 can be a word processor from which text is copied to browser application 78. Although FIG. 2 illustrates client application 76 and browser application 78 coupled to one another, in alternate embodiments of the invention there is no direct coupling of client application 76 and browser application 78.

Browser application 78 is any browser capable of communicating information across a communication link and displaying received information to the customer. Browser application 78 is not necessarily the same type of browser application used in agent computer system 50. In a particular embodiment, browser application 72 is capable of retrieving information from Internet 44 (e.g., in the form of Hypertext Markup Language (HTML) pages). Exemplary browser applications include Netscape Communicator™ and Internet Explorer™, identified above. Embodiments of the present invention can be implemented without any interaction between browser application 78 and other applications executed by customer computer system 52.

Internet phone application 80 allows the user of computer system 52 to establish a voice communication link across Internet 44 instead of using a telephone 56 and a PSTN 48. In particular embodiments of the invention, customer computer system 52 does not contain an Internet phone application. In these embodiments, the user of computer system 52 uses telephone 56 and PSTN 48 to establish a voice communication link with another individual or system. Alternatively, the user of computer system 52 may use a text chat window, discussed below with respect to FIG. 6, to communicate with another individual or system.

Database management server 60 (contained in server 40) manages information contained in database 58. The information stored in database 58 includes customer information, product or service information, transaction tracking information, and other data that may be used by transaction processing system 42, agents, customers, or server 40. Application server 62 communicates with database management server 60 and provides information to agent application 70. For example, application server 62 can retrieve information about a customer from database 58 using database management server 60. The retrieved information is then provided to agent application 70 across LAN 46 for display on agent computer system 50.

Control server 64 performs multiple control and management functions, as discussed in greater detail below with respect to FIG. 3. Control server 64 establishes and maintains communication links between multiple pairs of agents and customers. Control server 64 communicates with transaction processing system 42 to locate one or more available agents, establishes data and/or voice connections between agents and customers, and controls the flow of data between agents and customers.

Web server 66 communicates data, in the form of web pages, to browser applications 72 and 78. Additionally, web server 66 stores web pages and other web-based information used by the devices in the transaction processing environment. Web server 66 includes a filter service 68 that filters and modifies various web pages. Filter service 68 changes the web page content (e.g., by adding JavaScript methods) to allow the coordination and exchange of information between browser applications 72 and 78. For example, if a customer using browser application 78 changes information on a web page by entering information on a form, the information entered by the customer may be communicated to the agent's browser application 72. Similarly, if an agent selects a different web page using browser application 72, the selected web page may be delivered to browser application 78 for viewing by the customer. Thus, the changes made to the web page by filter service 68 allow other services, discussed below, to coordinate web pages and web page information between browser applications 72 and 78 such that the agent and the customer view the same web page with the same information. Additional details regarding the various services that coordinate and exchange information between the browser applications are provided below with respect to FIGS. 3 and 4.

Figure 3:
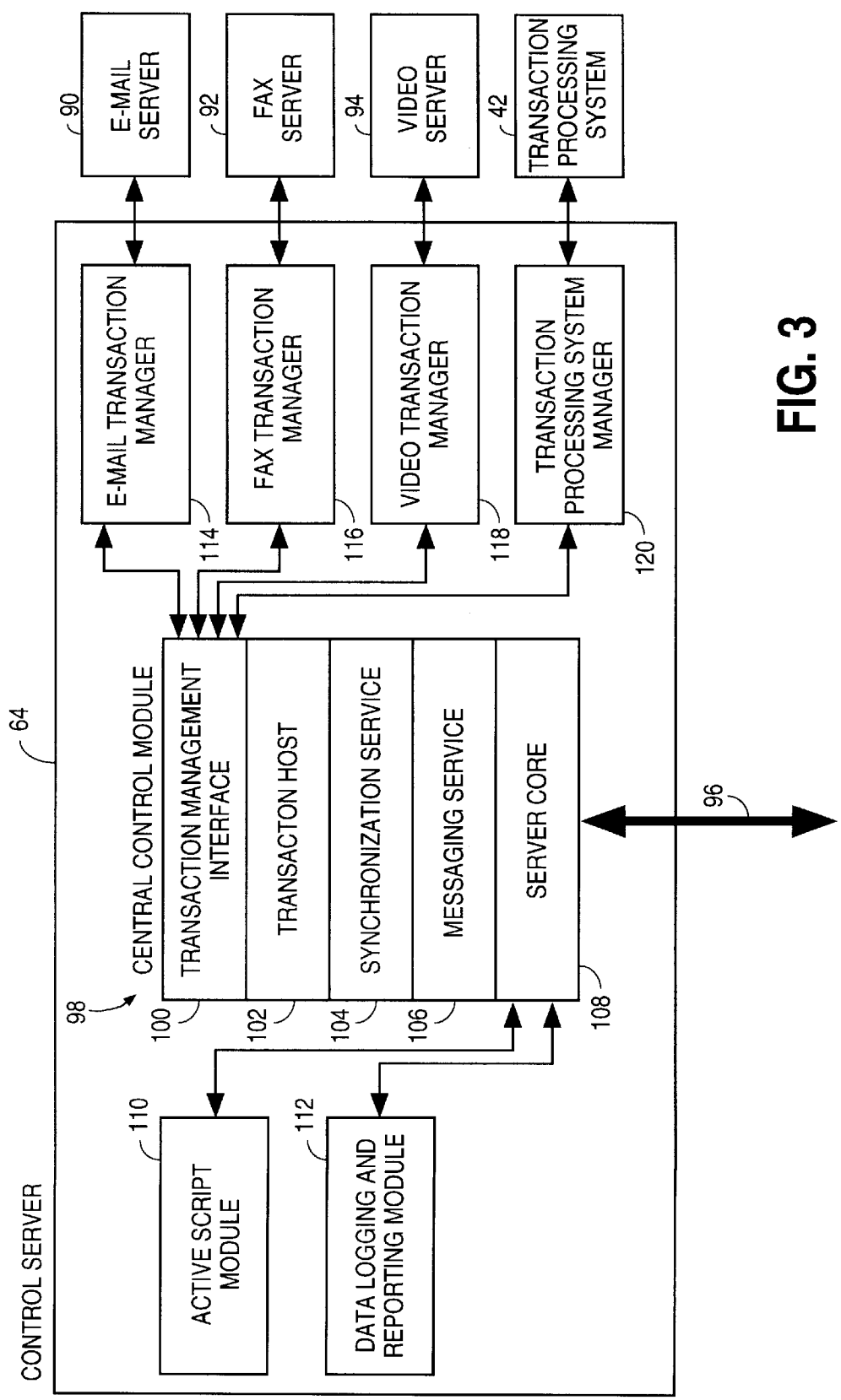
FIG. 3 illustrates an embodiment of a control server.

FIG. 3 illustrates an embodiment of control server 64, shown as part of server 40 in FIG. 2. Control server 64 is shown coupled to an e-mail server 90, a fax server 92, a video server 94, and transaction processing system 42. E-mail server 90 handles both incoming e-mail (e.g., from a customer) and outgoing e-mail (e.g., from an agent). Fax server 92 handles both incoming and outgoing facsimiles. Video server 94 handles video information and video sessions, for use by an agent, customer, or other device or user in the transaction processing environment. Additionally, video server 94 handles other multimedia information and multimedia sessions (e.g., sessions that exchange both audio and video data). Transaction processing system 42 handles various transactions, as discussed above. E-mail server 90, fax server 92, and video server 94 may be coupled directly to control server 64 (and server 40 shown in FIG. 2) or coupled to control server 64 through a network (e.g., LAN 46) or other communication medium. In alternate embodiments of the invention, any one or more of servers 90–94 can be contained within server 40 (FIG. 2) and coupled directly to control server 64.

Control server 64 communicates with e-mail server 90, fax server 92, and video server 94 using any type of communication medium, such as LAN 46. In this embodiment of the invention, control server 64 communicates with transaction processing system 42 using a dedicated communication line, as shown in FIG. 2. In alternate embodiments of the invention, control server 64 communicates with transaction processing system 42 across a network, such as LAN 46 (FIG. 2). Control server 64 also communicates with other systems, such as browser applications and web servers, using a communication link 96. In an embodiment of the invention, communication link 96 is a network communication link (e.g., a communication link in LAN 46). Alternatively, communication link 96 may be a dedicated communication link to one or more devices in the transaction processing environment. Communication link 96 is used to communicate various commands and other information between control server 64 and other devices.

As shown in FIG. 3, control server 64 includes an active script module 110 that handles the display of scripts and other information to an agent using the agent's browser application 72. An embodiment of active script module 110 generates scripts in the form of web pages that can be displayed on the agent's browser application. Additional details regarding agent scripts and other information displayed using an agent's browser application are provided below with respect to FIG. 6.

A data logging and reporting module 112 controls the storage (or logging) of transaction information in database 58 using database management server 60. Additionally, module 112 is capable of generating various types of reports summarizing or identifying performance characteristics and other information related to the transaction processing environment. For example, module 112 may generate reports detailing the overall transaction handling performance, such as the number of transactions handled per hour, the average response time for each type of transaction, and the number of transaction responses that exceeded a quality of service limit for the transaction.

A central control module 98 includes a transaction management interface 100, a transaction host 102, a synchronization service 104, a messaging service 106, and a server core 108. Server core 108 receives new requests (e.g., on communication link 96) from other devices in the transaction processing environment and provides the request to one or more other modules for processing. For example, server core 108 may continuously monitor communication link 96 for request signals that can be handled by server core 108. If the request signal is a request to generate a performance report, server core 108 forwards the request to data logging and reporting module 112 for processing. Module 112 then generates the requested report and provides the report to server core 108, which communicates the report to the appropriate device via communication link 96. Similarly, if the request signal is a request for an agent script, server core 108 forwards the request to active script module 110, which selects or generates an appropriate agent script. Module 110 provides the agent script to server core 108, which then communicates the agent script to the appropriate device (e.g., the requesting device).

Requests that cannot be handled by active script module 110 or data logging and reporting module 112 are communicated to another portion of central control module 98 for processing. Messaging service 106 establishes and manages message types used to communicate information between two or more individuals or devices in a transaction processing environment (e.g., message types used to communicate information between an agent and a customer). After a communication link has been established between, for example, an agent and a customer, messaging service 106 maintains the network or communication addresses for both the agent and customer. Typically, messaging service 106 establishes and manages multiple communication links for multiple customer-agent communications.

Synchronization service 104 synchronizes changes between all participants in a particular communication. For example, in an agent-customer communication, any changes entered to a web page by the customer are identified by synchronization service 104, and provided to the agent's browser application. Thus, synchronization service 104 ensures that all participants in a communication are provided with the same information.

Transaction host 102 manages various portions of the interaction between, for example, an agent and a customer. Transaction host 102 maintains the status of multiple interactions and maintains the identity (such as the network or communication address) of each participant involved in each interaction. If a request is received to provide information to a participant, then transaction host 102 determines the address associated with the participant and provides the address to the appropriate module responsible for providing the requested information.

Transaction management interface 100 is coupled to an e-mail transaction manager 114, a fax transaction manager 116, a video transaction manager 118, and a transaction processing system manager 120. Transaction management interface 100 manages the interaction and exchange of information between central control module 98 and the various transaction managers 114–120. Each transaction manager 114–120 handles a particular type of transaction, and communicates with the server responsible for that transaction type. In alternate embodiments of the invention, two or more of transaction managers 114–120 are combined into a single transaction manager. When server core 108 receives a request that requires interaction with a server or device external to control server 64, then transaction management interface 100 contacts the appropriate transaction manager for processing the request. For example, if server core 108 receives a request to select an agent to handle a transaction, then transaction management interface 100 contacts transaction processing system manager 120 to request an agent from transaction processing system 42.

Transaction management interface 100 may receive requests (or calls for service) from server core 108 or transaction host 102. Additionally, transaction management interface 100 may receive requests from any transaction manager 114–120. For example, e-mail transaction manager 114 may notify transaction management interface 100 that e-mail server 90 has received an e-mail that requires processing. Transaction management interface 100 then communicates the information regarding the received email to other services or managers to determine how the e-mail should be handled. For example, transaction processing system manager 120 may be contacted to identify an agent to handle the e-mail. The manner in which the e-mail is to be handled is then communicated to e-mail transaction manager 114, which then instructs e-mail server 90 regarding the processing of the e-mail.

Figure 4:
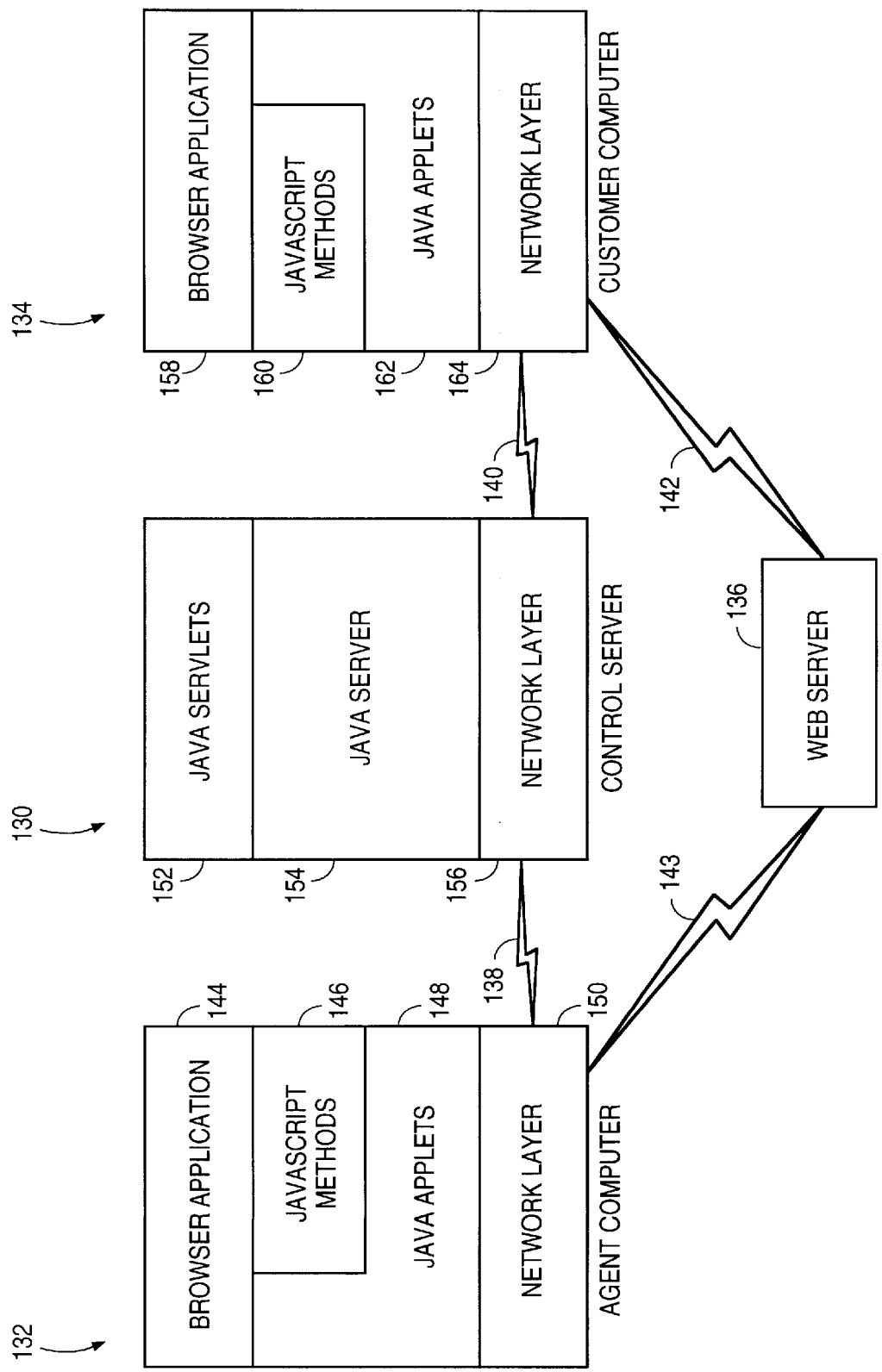
FIG. 4 illustrates an embodiment of a system architecture for communicating information between various devices in a transaction processing environment.

FIG. 4 illustrates an embodiment of a system architecture for communicating information between various devices in a transaction processing environment. The system architecture of FIG. 4 includes a control server 130, an agent computer 132, and a customer computer 134. Agent computer 132 is coupled to control server 130 via communication link 138 (e.g., LAN 46 in FIG. 2) and coupled to a web server 136 via communication link 143 (e.g., Internet 44). Customer computer 134 is coupled to control server 130 using communication link 140 (e.g., Internet 44 in FIG. 2). Customer computer 134 is also coupled to web server 136 via communication link 142 (e.g., Internet 44). Web server 136 stores and distributes various web pages requested by a browser application. Although web server 136 and control server 130 are shown as two separate servers in FIG. 4, they may be hosted by the same hardware or the same server system.

Agent computer 132 contains a browser application 144 of the type discussed above with respect to FIG. 2. The embodiment of the system architecture shown in FIG. 4 is implemented using the Java™ programming language Gava is a trademark of Sun Microsystems Inc. of Mountain View, Calif.). Alternate embodiments of the invention may be implemented using other programming languages, including object oriented programming languages. Agent computer 132 contains one or more JavaScript methods 146 and one or more Java applets 148. A JavaScript method is a sequence of instructions that perform various operations and have the ability to invoke Java methods. A Java applet is a program, written in Java, that may be stored within a web page. When the web page is retrieved by a browser application, the Java applet is executed by the browser and performs the programmed operations. The activity or operation performed by the agent (or the agent's browser application 144) determines whether a JavaScript method or a Java applet is activated. For example, if the agent clicks an icon associated with a Java applet, then the Java applet is activated. However, if the agent performs an operation that is associated with a JavaScript method, then the JavaScript method is performed in response to the operation.

Agent computer 132 includes a network layer 150, which is a logical layer at which agent computer 132 communicates with other devices via communication link 138. Control server 130 has a network layer 156, which communicates with control layer 150 to exchange information between control server 130 and agent computer 132. A Java server 154 communicates with network layer 156 to exchange information with other devices (e.g., agent computer 132 and customer computer 134). Java server 154 corresponds to server core 108 (FIG. 3) and controls the overall operation of control server 130. Java server 154 is implemented using the Java programming language. Java server 154 communicates with one or more Java servlets 152, which perform various operations necessary to process transactions and communicate information between devices. In a particular embodiment, Java servlets 152 may correspond to various modules shown in FIG. 3, such as transaction management interface 100, transaction host 102, synchronization service 104, messaging service 106, active script module 110, and data logging and reporting module 112.

A network layer 164 in customer computer 134 communicates with network layer 156 and with web server 136. Although not shown in FIG. 4, web server 136 may also include a network layer for communicating data across communication link 142. Customer computer 134 contains one or more Java applets 162 and one or more JavaScript methods 160. Additional details regarding the operation of Java applets 162 and JavaScript methods 160 are provided below. Customer computer 134 also includes a browser application 158 of the type discussed above with respect to FIG. 2.

In a particular embodiment of the invention, an agent is able to "push" a web page or other information to a customer using the system shown in FIG. 4. For example, the agent may identify a particular web page and communicate the uniform resource locator (URL) associated with the web page to customer computer 134 via control server 130. The customer's browser application 158 receives the URL and retrieves the associated web page from web server 136. Thus, the agent "pushes" the web page to the customer by providing the URL associated with the web page to the customer's browser application.

Figure 5:
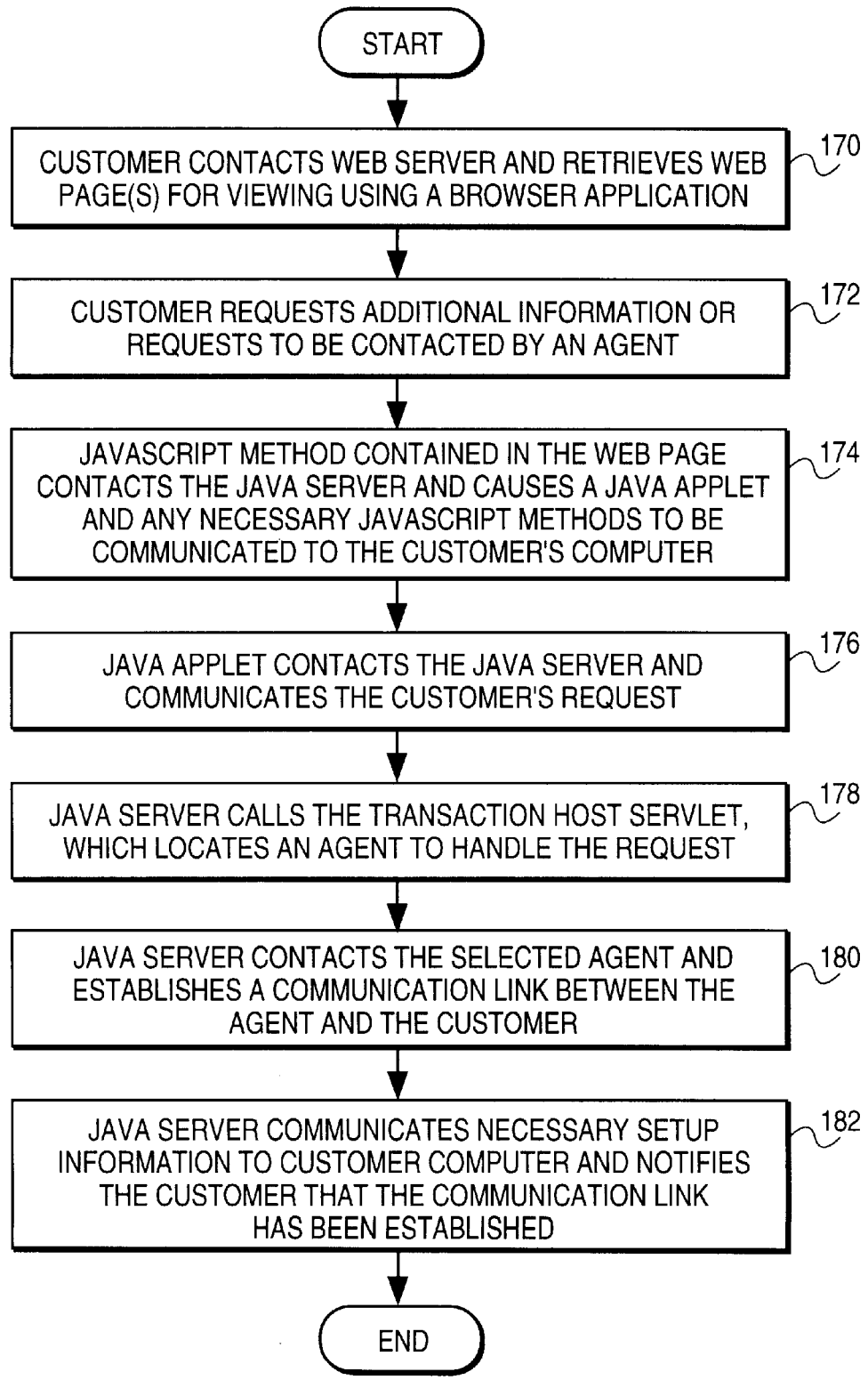
FIG. 5 is a flow diagram illustrating an embodiment of a procedure for communicating information between various devices using the architecture of FIG. 4.

FIG. 5 is a flow diagram illustrating an embodiment of a procedure for communicating information between various devices using the architecture of FIG. 4. At step 170, a customer contacts a web server (e.g., web server 136) and retrieves one or more web pages for viewing using a browser application (e.g., browser application 158). At step 172, the customer requests additional information about a product or service, or requests to be contacted by an agent. The customer may specify the manner in which the information or agent contact is handled (e.g., by return telephone call, by e-mail, or by facsimile). If the customer requests to be contacted using a conventional telephone or by facsimile, then the customer is asked to provide a telephone number for initiating the telephone call or facsimile. At step 174, a JavaScript method, contained in the web page accessed by the customer, is executed by the customer's browser application. When executed, the JavaScript method causes the customer's computer to contact the Java server (e.g., Java server 154) and requests a Java applet and any necessary JavaScript methods. The requested Java applet and JavaScript methods are then communicated from the Java server to the customer's computer. The particular Java applet and JavaScript methods communicated to. the customer's computer may vary depending on the web page that was being viewed by the customer when the request for additional information or agent contact was entered. The particular web page being viewed may contain JavaScript methods that identify the necessary Java applet and JavaScript methods to be communicated to the customer's computer.

At step 176, the Java applet (running on the customer's computer) contacts the Java server and communicates the customer's request to the Java server. In this example, the customer has requested that an agent contact the customer by return telephone call. Step 178 calls the transaction host servlet (e.g., the servlet that performs the functions of transaction host 102 in FIG. 3), which locates an agent to handle the customer's request. An agent may be located by communicating with transaction processing system manager 120 to select an agent and to initiate a telephone call across the PSTN.

After an agent has been selected to handle the customer's request, step 180 contacts the selected agent and informs the agent regarding the customer's request. At this time, information about the customer may be displayed to the selected agent (e.g., account information, or past purchases). Step 180 also establishes a communication link (in this example, a telephone link) between the selected agent and the customer. A transaction processing system may be used to automatically establish the telephone link across a PSTN or a web server may be used to establish an Internet telephone call across the Internet. In particular embodiments of the invention, both a voice communication link and a data communication link are established between the agent and the customer. The data communication link can be established and maintained by the control server. Both the agent computer and the customer computer may communicate with the control server, which coordinates the flow of messages and other information between the agent and the customer. For example, the control server forwards messages received from the agent computer system to the customer computer system, and vice versa.

At step 182, the Java server communicates any necessary setup information to the customer's computer and notifies the customer that the communication link has been established. This notification can be performed, for example, by communicating through the network layers to the customer's browser application. In this example, the customer requested a return telephone call. Although a return telephone call has been initiated, the customer and the agent may continue to communicate using their browser applications. For example, the agent may "push" web pages or other information to the customer for viewing using the customer's browser application.

Figure 6:
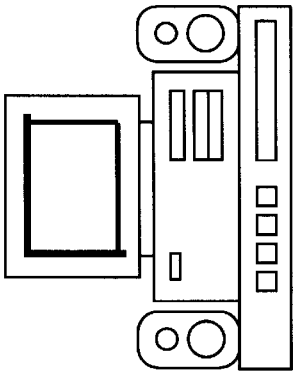
FIG. 6 illustrates an embodiment of various windows displayed to an agent using the agent's computer.

FIG. 6 illustrates an embodiment of various windows (also referred to as frames) displayed to an agent using the agent's computer. An agent's computer includes a display device that provides visual information to the agent. In FIG. 6, an agent's browser application generates a display 190 containing multiple frames 192, 194, 196,198, and 200. Frame 192 represents the web page or other information currently being displayed to the customer. Thus, the agent is able to easily determine what information is available to the customer based on frame 192. Additionally, the agent can provide additional information about a product or service while referring to the information already displayed to the customer. Frame 194 is a text chat window that allows the agent and the customer to communicate using typed information. The text chat window can be used at any time, and is particularly useful when a voice connection cannot be established between the agent and the customer (e.g., the customer does not have an Internet phone and has only one telephone line, which is used to access the Internet).

Frame 196 of display 190 contains various system information such as information about the agent and information relating to the overall system performance. Frame 196 may also be used to display messages to an agent from a supervisor or system administrator (e.g., asking the agent if they are available to work overtime, or notifying the agent of their next scheduled break). Frame 198 displays agent script information, such as a prepared script to be read to a customer. The script displayed in frame 198 may be modified to correspond to the product or service being discussed, or the script may be modified to include information about the customer (e.g., the customer's name). Frame 200 provides various links to information that may be provided by the agent to the customer. In a particular embodiment of the invention, the links shown in frame 200 are associated with web pages that contain information of interest to particular customers. For example, the link "FAQ-Acme XL-3000" may identify a web page that contains answers to frequently asked questions about the Acme XL-3000 computer system. If the agent wants to display these answers to the customer, the agent can select the link, which causes the web page to be transmitted to the customer's browser application. The same web page is then displayed in frame 192, to maintain correspondence between frame 192 and the web page displayed to the customer.

FIG. 7 illustrates another embodiment of various frames that may e displayed to an agent using the agent's computer. FIG. 7 shows an gent script frame 198, which contains a script that an agent reads to another person, such as a customer (also referred to as an information requester or an information recipient). The agent script may be read by the agent verbatim, or an outline of the agent script may be displayed which allows the agent to read the script to the customer using the agent's own words. Frame 200 contains multiple information identifiers (also referred to as links). Each information identifier shown in frame 200 is associated with a particular information set (e.g., answers to frequently asked questions, product descriptions, or promotional information). The information identifiers may be associated with a web page, computer file, or any other information set. A prompt frame 202 displays prompts to the agent (e.g., comments or suggestions from a supervisor). The information displayed in prompt frame 202 is not read to another person, but instead provides instructions or suggestions to the agent. A frame 204 provides a mechanism that allows the agent to enter a URL or other information identifying a web page or other information set. The agent is able to "push" information to a customer by entering the URL or other identifier in frame 204. If the information set that the agent wants to send to the customer is not displayed in links frame 200, the agent can enter the URL, filename, or other information identifier to send the information set to the customer.

Although not shown in FIG. 6 or 7, one or more frames may contain scroll bars that allow the agent viewing the frame to view selected portions of the information contained in the frame. Additionally, the size of each frame may be dynamic; i.e., the frame size changes based on the amount of information contained in the frame. For example, in the embodiment of FIG. 7, if additional links are displayed such that frame 200 cannot simultaneously display all links, frame 200 can be enlarged while frame 198 is decreased in size. Frame 198 is reduced in size because it contains significant unused space. In other embodiments of the invention, the size of each frame can be adjusted by the agent based on the amount of information they want displayed in each frame.

The various links displayed in frame 200 can be pushed by the agent to a customer by selecting the link (e.g., clicking on the link using a mouse and a pointer or cursor). The links displayed in frame 200 can be links to web pages, such that when a link is selected by the agent, the URL associated with the web page is sent to a customer's browser. The customer's browser then retrieves the web page and displays the web page to the customer. When an agent selects a link to a web page, the same web page is displayed on the agent's computer (e.g., in frame 192 shown in FIG. 6). The links displayed in frame 200 may be links to multi-media web pages or other multi-media information. Alternatively, the links displayed in frame 200 can identify computer files or other information sets that may be provided to a customer.

In particular situations, one or more frames may not be displayed. For example, if an agent is communicating with a customer using only the telephone (i.e., no connection between the agent's computer and the customer's computer), then frames 200 and 204 in FIG. 7 may not be displayed, since the agent is unable to send information to the customer's computer.

Figure 8:
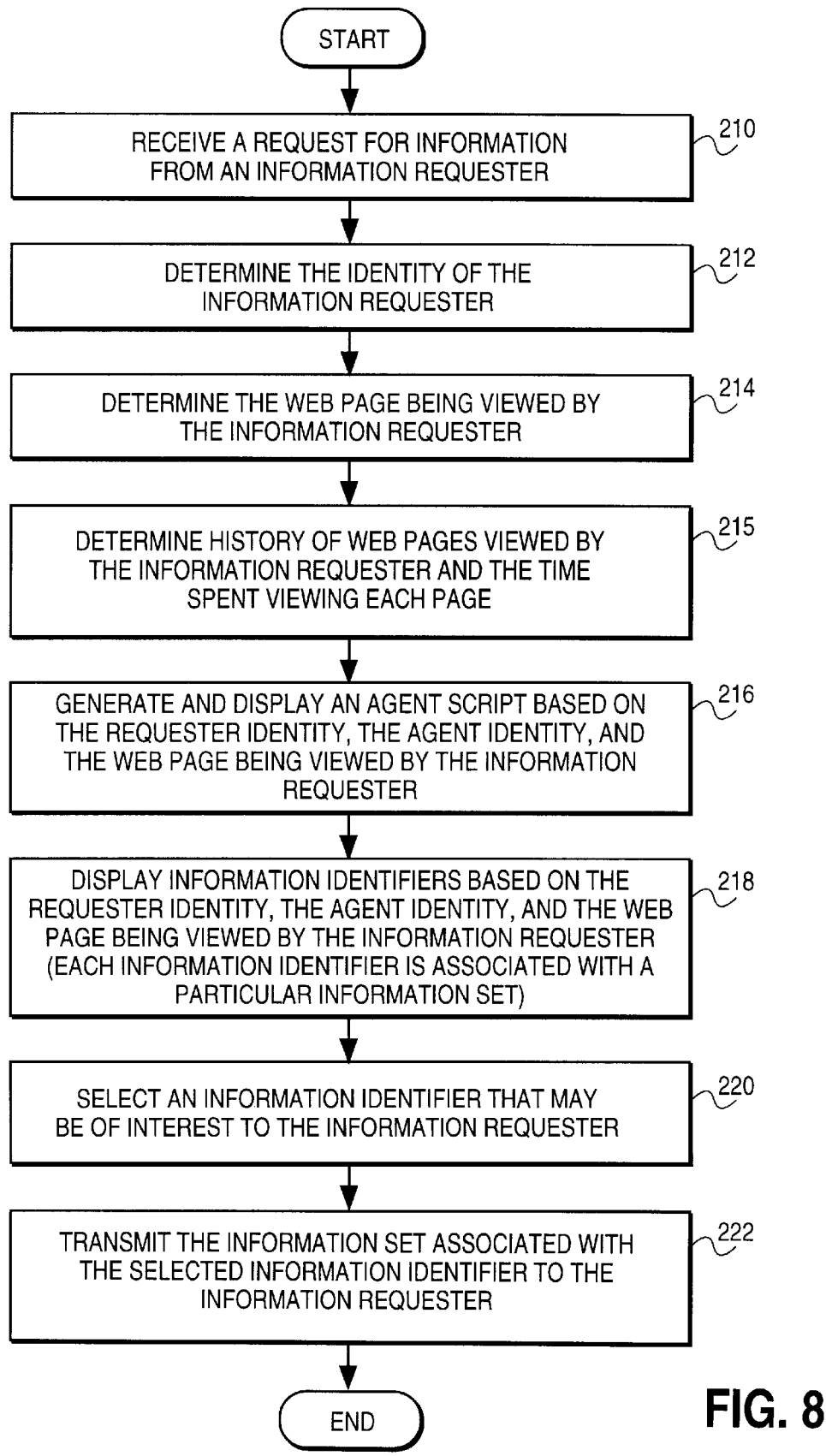
FIG. 8 is a flow diagram illustrating an embodiment of a procedure for displaying an agent script and various information identifiers.

FIG. 8 is a flow diagram illustrating an embodiment of a procedure or displaying an agent script and various information identifiers. The procedure described with respect to FIG. 8 allows an agent to "push" web pages or other information to a customer across a network, such as the Internet. At step 210, a request for information is received from an information requester, such as a customer or a prospective customer. An information requester (or an information recipient) is any person or entity capable of communicating with an agent across a network, telephone line, or any other communication medium. The request for information may be a request for information regarding a particular product, technical support questions, or questions regarding information already retrieved from a web page. At step 212, the procedure determines the identity of the information requester. The requester's identity can be provided by the requester (e.g., by providing an account number or customer name). Alternatively, the requester's identity can be determined from the requester's network address. Other embodiments of the invention determine the requester's identity based on the information provided when the requester logged into the web server. An identifier associated with the requester may be stored on the requester's computer such that the requester's identity can be determined in the future, regardless of whether the requester has logged into the web server.

Step 214 of FIG. 8 determines the web page being viewed by the information requester. This information may be provided by a Java applet or JavaScript, discussed above, executed by the requester's computer. For example, the URL of the viewed web page may be communicated to the transaction processing system along with the request for information (i.e., transmitted when the customer initiates a request for information). Step 215 determines the history of web pages viewed by the information requester and the time spent viewing each page. The history of web pages viewed may include information regarding the content of the pages viewed (e.g., the product or service described in the web page). This information provides an indication of the type of information or assistance the requester may be seeking.

At step 216, the procedure generates and displays an agent script based on the requester's identity (determined in step 212), the agent's identity (known by the agent's computer system), and the web page being viewed by the information requester. The agent script generated in step 216 uses the requester's identity and the agent's identity to personalize the script. Additionally, information regarding the web page being viewed by the information requester may be used to predict the type of information the requester desires. For example, if the requester was viewing a web page associated with a particular computer system, then the script may include a reference to that computer system. Similarly, if the requester was viewing a web page associated with a particular type or family of mutual funds, the script may include a reference to that type or family of funds. In other embodiments of the invention, one or more of the parameters discussed above to generate the agent script may be disregarded. For example, if the identity of the requester is unavailable, then it cannot be used to generate the agent script.

Step 218 displays one or more information identifiers based on the requester's identity, the agent's identity, the web page being viewed by the information requester, and the history of web pages viewed by the requester. Each information identifier (also referred to as a link) is associated with a particular information set, such as a web page. The information identifiers are displayed to the agent and allow the agent to selectively provide information to the information requester (e.g., by pushing a web page associated with an information identifier). The requester's identity may be used to determine what types of information might be of interest to the requester. For example, if the requester only invests in mutual funds, then information identifiers associated with information relating to stocks or bonds would not be displayed to the agent. Additionally, the web page being viewed can be used to determine the type of information that might be useful to the requester. In particular embodiments of the invention, one or more of the parameters discussed above to display information identifiers may be disregarded. In an embodiment of the invention, the information identifiers are selected to provide the most effective promotion of a company's product or service based on information known about the requester.

The identity of the information requester, the web page being viewed by the information requester, and the history of web pages viewed can also be used to select an appropriate agent to handle the request for information. For example, an agent familiar with the information requester or familiar with the information contained in the web page being viewed may be selected to handle the request. Additionally, the prompts provided to the selected agent may be based on the identity of the information requester, the web page being viewed by the information requester, and the history of the web pages viewed.

At step 220, the agent selects an information identifier that may be of interest to the information requester. The selection of an information identifier may be performed by using a pointing device to position a pointer or cursor over the desired information identifier and activating a button or other mechanism on the pointing device to select the desired information identifier. After selecting an information identifier, step 222 transmits the information set associated with the selected information identifier to the information requester. If the information identifier is a link to a web page, then the URL associated with the web page is transmitted to the requester's computer, thereby allowing the requester's computer to retrieve the web page for display to the requester. Additionally, the web page is displayed in a frame on the agent's computer.

Figure 9:
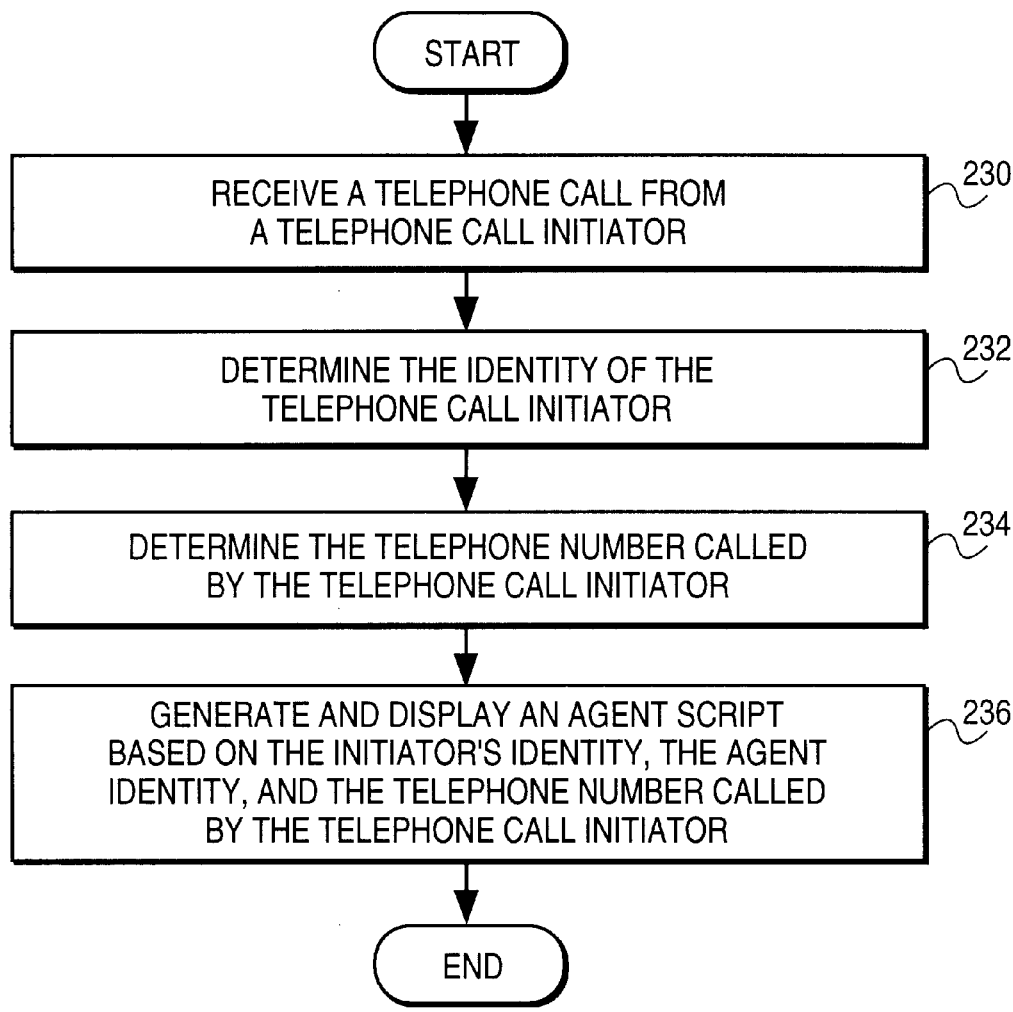
FIG. 9 is a flow diagram illustrating an embodiment of a procedure for displaying an agent script in a telephone call processing environment.

FIG. 9 is a flow diagram illustrating an embodiment of a procedure for displaying an agent script in a telephone call processing environment. In the embodiment of FIG. 9, the agent's computer does not have a connection to the information requester's computer (or the information requester does not have a computer). Thus, the embodiment of FIG. 9 may not display information identifiers associated with information sets that can be pushed to the requester. However, the information identifiers may be displayed for the benefit of the agent (e.g., the agent can display the information set and read or describe the information contained in the set).

At step 230, a telephone call is received from a telephone call initiator (also referred to as an information requester). Step 232 determines the identity of the telephone call initiator. The identity of the telephone call initiator can be determined by detecting the telephone number of the call initiator and determining the individual or entity associated with that telephone number. For example, a database of all customers may be searched to determine the customer associated with the telephone number of the received telephone call. Alternatively, an integrated voice response (IVR) system can be used to retrieve a telephone call initiator's account number or identity.

Step 234 determines the telephone number called by the telephone call initiator. A single telephone call processing system may receive telephone calls for multiple numbers (e.g., a technical support number and a sales number). Step 236 generates and displays an agent script based on the initiator's identity, the agent's identity, and the telephone number called by the telephone call initiator. As discussed above, the initiator's identity and the agent's identity can be used to personalize the agent script. The telephone number called by the call initiator is used to customize the script for the type of information the call initiator is likely to request (e.g., technical support information or sales information). The identity of the call initiator and the telephone number called can also be used to select an appropriate agent to handle the telephone call.

Figure 10:
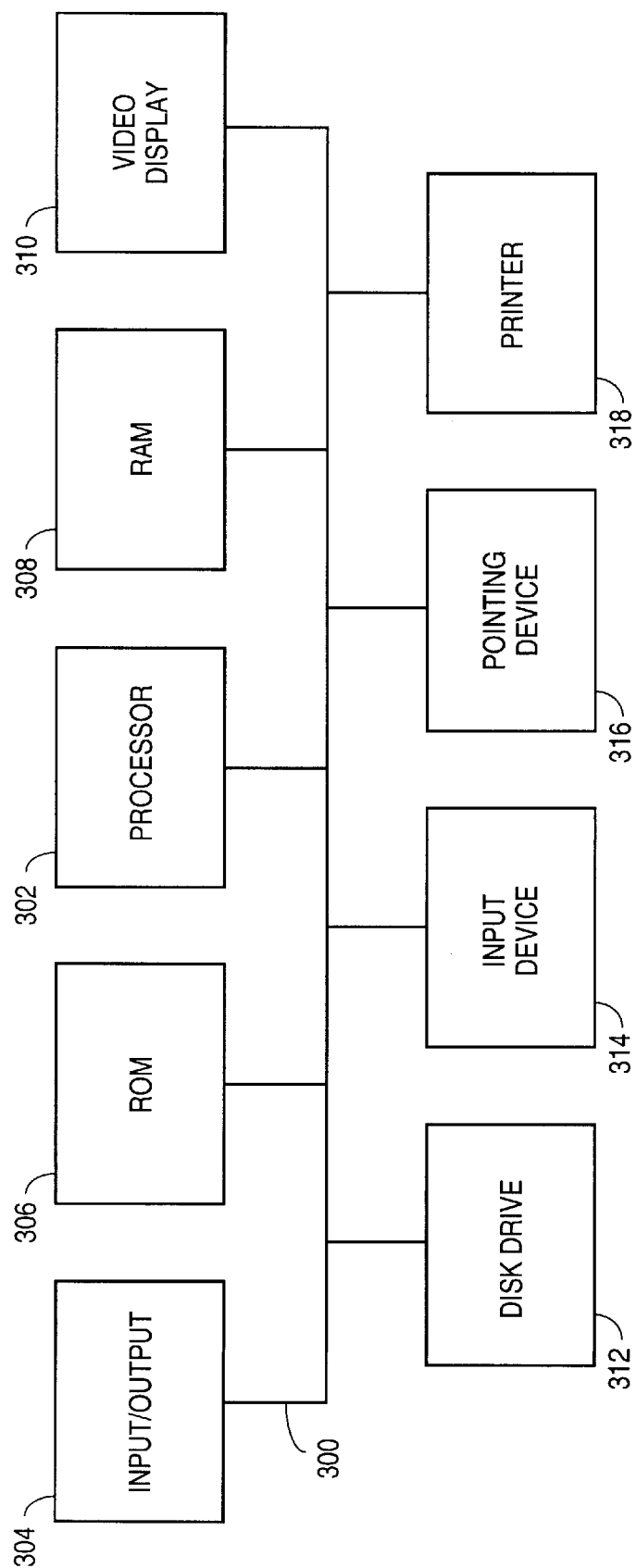
FIG. 10 illustrates an embodiment of a computer system that can be used with the present invention.

FIG. 10 illustrates an embodiment of a computer system that can be used with the present invention. For example, embodiments of the invention may use a computer of the type shown in FIG. 10 for an agent's computer, a customer's computer, a server, a transaction processing system, or any other device contained in or used with the transaction processing environment discussed above. The various components in FIG. 10 are provided by way of example. Certain components of the computer in FIG. 10 can be deleted for particular implementations of the invention. The computer system shown in FIG. 10 may be any type of computer, including a general purpose computer.

FIG. 10 illustrates a system bus 300 to which various components and devices are coupled. A processor 302 performs the processing tasks required by the computer. Processor 302 may be any type of processing device capable of implementing the steps necessary to perform the various procedures and operations discussed above. An Input/Output (I/O) device 304 is coupled to bus 300 and provides a mechanism for communicating with other devices coupled to the computer. A Read-Only Memory (ROM) 306 and a Random Access Memory (RAM) 308 are coupled to bus 300 and provide a storage mechanism for various data and information used by the computer. Although ROM 306 and RAM 308 are shown coupled to bus 300, in alternate embodiments, ROM 306 and RAM 308 are coupled directly to processor 302 or coupled to a dedicated memory bus (not shown).

A video display 310 is coupled to bus 300 and displays various information and data to the user of the computer. A disk drive 312 is coupled to bus 300 and provides a mechanism for the long-term mass storage of information. An input device 314 and a pointing device 316 are also coupled to bus 300 and allow the user of the computer to enter information and commands to the computer system. Input device 314 may be, for example, a keyboard, keypad, handwriting recognition device, or voice recognition device. Pointing device 316 includes, for example, a mouse, track ball, or touch pad. A printer 318 is coupled to bus 300 and is capable of creating a hard copy of information generated by or used by the computer.

Embodiments of the present invention may be implemented using a computer-readable medium (also referred to as a processor-readable medium) containing various sets of instructions, code sequences, configuration information, and other data used by a computer or other processing device. The various information stored on the computer readable medium is used to perform various data communication, data processing, and data handling operations, such as those described above. The computer-readable medium may be any type of magnetic, optical, or electrical storage medium including a diskette, magnetic tape, CD-ROM, memory device, or other storage medium.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of providing information to an information requester, the method comprising displaying a plurality of information identifiers, wherein each information identifier is associated with a particular information set and wherein the displayed plurality of information identifiers are determined based on an identity of the information requestor;

detecting selection of one of the plurality of information identifiers by an information recipient; and providing the information set associated with the selected information identifier to the information requester.

2. The method of claim 1 wherein the selection of one of the plurality of information identifiers is performed by an agent of a transaction processing system.

3. The method of claim 1 wherein the method is performed by a transaction processing system.

4. The method of claim 1 wherein the displayed plurality of information identifiers are determined based on a history of web pages viewed by the information requester.

5. The method of claim 1 wherein the displayed plurality of information identifiers are determined based on a web page being viewed by the information requester.

6. The method of claim 1 wherein the displayed plurality of information identifiers are determined based on a telephone number of the information requester.

7. The method of claim 1 wherein the displayed plurality of information identifiers are determined based on a telephone number called by the information requester.

8. The method of claim 1 wherein each information identifier represents a link to a web page containing information.

9. The method of claim 1 wherein the providing of the information set associated with the selected information identifier to the information requester includes transmitting a web page containing the information set to the information requester.

10. The method of claim 1 wherein the displayed plurality of information identifiers are each associated with a web page containing information sets.

11. The method of claim 1 wherein the displayed plurality of information identifiers are each associated with a computer file containing information sets.

12. A method of generating an agent script, the method comprising:
  determining a web page being viewed by an information requester when a request for information was initiated; and
  generating an agent script based on the web page being viewed by the information requester when the request for information was initiated.

13. The method of claim 12 further including displaying a plurality of information identifiers.

14. The method of claim 13 wherein the plurality of information identifiers are displayed based on the identity of the information requester.

15. The method of claim 13 wherein the plurality of information identifiers are displayed based on the web page being viewed by the information requester when the request for information was initiated.

16. The method of claim 13 wherein the plurality of information identifiers are displayed based on a history of web pages viewed by the information requester.

17. The method of claim 12 further including determining an identity associated with the information requester.

18. The method of claim 17 wherein the generating of the agent script further includes generating the agent script based on the identity associated with the information requester.

19. The method of claim 17 wherein the generating of the agent script further includes generating the agent script based on a history of web pages viewed by the information requester.

20. The method of claim 12 wherein the generating of the agent script further includes generating the agent script based on an identity of an agent handling the request for information.

21. The method of claim 12 wherein the agent script is read by an agent to the information requester.

22. The method of claim 12 wherein the method is performed by a transaction processing system.

23. The method of claim 13 wherein each information identifier is associated with a particular information set.

24. The method of claim 12 further including generating an agent prompt based on the web page being viewed by the information requester when the request for information was initiated.

25. The method of claim 12 further including generating an agent prompt based on a history of web pages viewed by the information requester.

26. A computer software product including a medium readable by a processor, the medium having stored thereon a sequence of instructions which, when executed by the processor, cause the processor to:
  determine a web page being viewed by an information requester when a request for information was initiated; and
  generate an agent script based on the web page being viewed by the information requester when the request for information was initiated.

27. The computer software product of claim 26 further including instructions which, when executed by the processor, cause the processor to determine an identity associated with the information requester.

28. The computer software product of claim 27 wherein the agent script is generated based on the identity associated with the information requester.

29. The computer software product of claim 26 wherein the agent script is generated based on a history of web pages viewed by the information requester.

30. The computer software product of claim 26 wherein the agent script is generated based on an identity of an agent handling the request for information.

* * * * *